Aug. 28, 1962 K. F. OLDENBURG 3,051,380

PERFORATED RECORD SENSING DEVICE

Filed March 3, 1958 5 Sheets-Sheet 1

Aug. 28, 1962 K. F. OLDENBURG 3,051,380

PERFORATED RECORD SENSING DEVICE

Filed March 3, 1958 5 Sheets-Sheet 2

Aug. 28, 1962 K. F. OLDENBURG 3,051,380

PERFORATED RECORD SENSING DEVICE

Filed March 3, 1958 5 Sheets-Sheet 3

Aug. 28, 1962 K. F. OLDENBURG 3,051,380

PERFORATED RECORD SENSING DEVICE

Filed March 3, 1958 5 Sheets-Sheet 5

3,051,380
Patented Aug. 28, 1962

3,051,380

PERFORATED RECORD SENSING DEVICE

Kenneth F. Oldenburg, Monterey Park, Calif., assignor to Clary Corporation, San Gabriel, Calif., a corporation of California Filed Mar. 3, 1958, Ser. No. 718,617
6 Claims. (Cl. 235—61.11)

This invention relates to apparatus capable of reading information punched in coded form in tags, cards, or the like.

Punched tags and cards of the above type are often attached of articles of merchandise to indicate the price and various characteristics of the articles. These tags are generally "read" by machines which assimilate such information and transfer it to a cash register, accounting machine, printer or the like when selling the articles, taking inventory, etc.

Such machines in general are quite bulky, requiring the tag to be removed from the article and inserted in the machine or requiring the article to be moved to close proximity to the machine. This is often of considerable inconvenience, especially in taking inventory, where every one of a large number of articles must be considered.

It therefore becomes a principal object of the present invention to provide a portable punched tag or card sensing device which may be held in one's hand.

Another object is to provide a punched tag sensing device which is simple and economical to manufacture.

A further object is to provide a punched tag sensing device which will tolerate tags in which the hole sizes and spacings vary considerably from a standard.

A further object is to facilitate handling and controlling a punched tag sensing device and the equipment controlled thereby.

The manner in which the above and other objects of the invention are accomplished will be readily understood on refernce to the following specification when read in conjunction with the accompanying drawings, wherein:

FIG. 13 is a sectional view of a modified form of tag sensing device.

Figures 1, 2, 3, 4, 5:
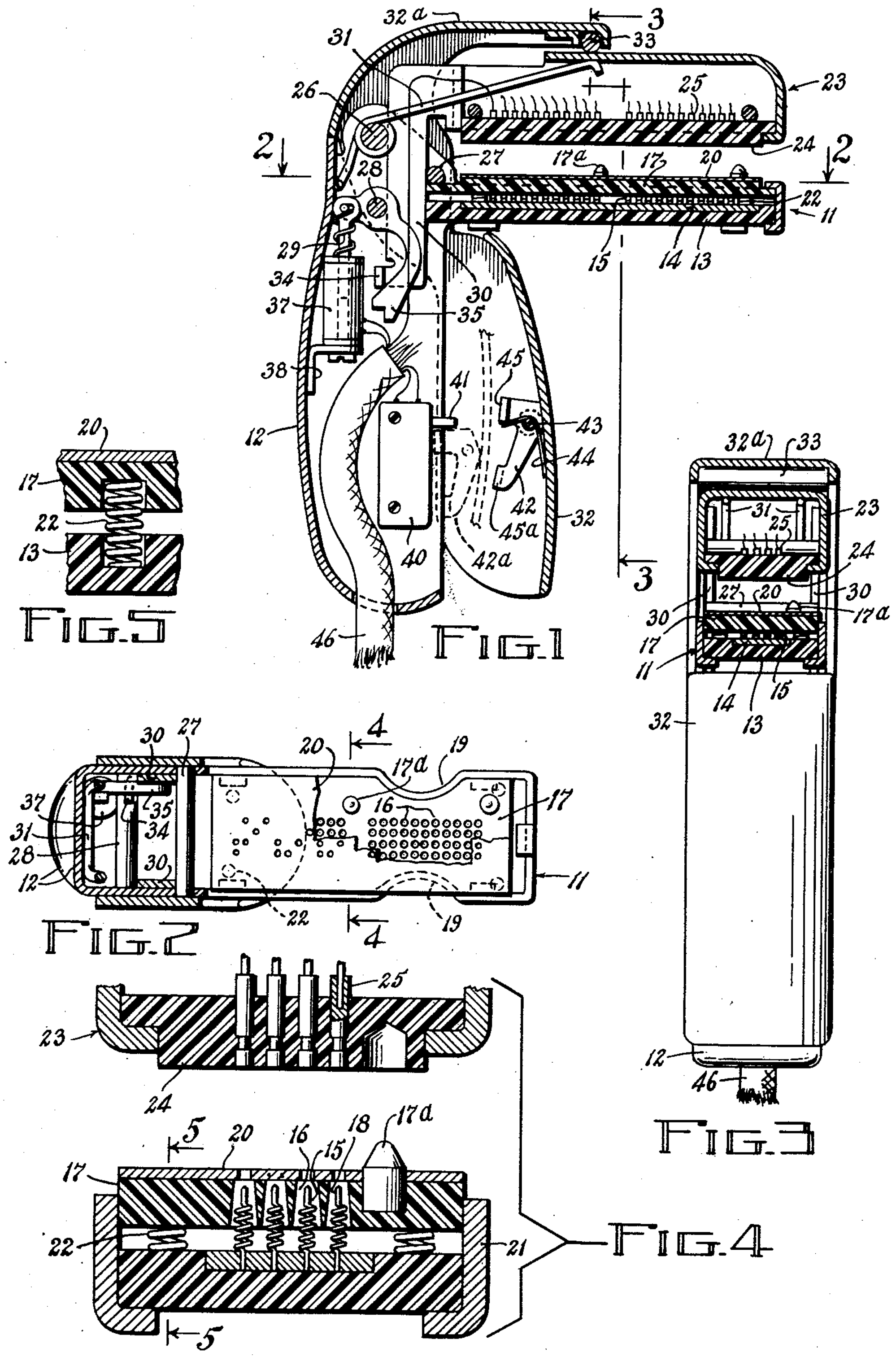
FIG. 1 is a sectional elevation view through the tag sensing device.
FIG. 2 is a sectional plan view through the tag sensing device and is taken along the line 2—2 of FIG. 1.
FIG. 3 is a sectional view taken substantially along the line 3—3 of FIG. 1.
FIG. 4 is an enlarged transverse sectional view through the jaw members and is taken along the line 4—4 of FIG. 2.
FIG. 5 is an enlarged sectional view through part of the jaw members, illustrating one of the springs for normally spacing the tag locating plate above the tips of the sensing springs.

Referring in detail to the drawings, the tag sensing device comprises a lower jaw, generally indicated at 11, which is integral with a hand grip 12.

A plate 13 of plastic, forming part of the jaw 11, has embedded therein a metal plate 14 having a plurality of holes therein arranged in a coordinate pattern in which are secured the ends of a plurality of upstanding sensing or contact springs 15. The latter are capable of yielding under compression and also laterally.

The springs 15 extend upwardly into holes 16 formed in a tag locating plate 17 of plastic material and terminate in sensing tips 18 adapted to enter aligned perforations in a perforated tag 20 placed on top of the plate 17.

The plate 17 is slideably mounted in surrounding flanges 21 forming part of the jaw 11 and is normally held in its upper illustrated position by a set of compression springs 22. Thus, the upper tag supporting surface of the plate 17 is normally held slightly above the sensing spring tips.

Locating studs 17*a* are embedded in the plate 17 to receive locating holes in the tag whereby to properly locate the tag relative to the various sensing springs.

An upper jaw, generally indicated at 23, extends parallel to the lower jaw 11. A plastic contact plate 24, carried by the jaw 23, has mounted therein a plurality of contacts 25 aligned with respective ones of the sensing springs 15. The jaw 23 is guided for vertical movement by three studs 26, 27 and 28 extending between the sides of the hand grip 12 whereby to vertically guide opposite edges of downwardly projecting extensions 30 of the jaw 23. Normally, the jaw 23 is held in spaced relation with the jaw 11 by a torsion spring 31 wrapped around the stud 26 and extending between the jaw 23 and the hand grip 12. This enables a punched tag to be readily inserted over the studs 17*a* or to be removed. To further facilitate placement or removal of a tag the side flanges 21 are indented at 19 to permit grasping of the tag at this point.

Pivotally supported on the stud 26 and cooperating with the hand grip 12 is a second hand grip 32 having an upward extension 32*a* carrying a roller 33 which rests against the top of the jaw 23 directly above the outer terminal ends of the torsion spring 31.

From the above it will be seen that when the hand grips are squeezed together, the jaw 23 will be lowered, causing the contact plate 24 to engage the tag 20 and to thereafter compress the springs 22 in lowering the plates 17 so that the sensing tips 18 may project through any aligned perforations in the tag to contact their respective aligned contacts 25 so as to establish digit indicating circuits as will be described later. In those cases where no perforation occurs in the tag, the springs 15 will merely compress axially without establishing a corresponding circuit. At this point, an ear 34 on one of the extensions 30 of the upper jaw will pass below a latching shoulder formed on a latch 35, thereby latching the jaws in "closed" condition to maintain any established digit circuits complete until the latch 35 is later released.

It will be noted that holes 16 in the plate 17 are somewhat larger than the holes or perforations in the tag. Also, the diameters of the sensing tips 18 are materially smaller than the diameters of the tag perforations, thus permitting the springs 15 to sense tag perforations which are materially misaligned due to stretch or shrinkage of the tag or due to other reasons. In this regard, the springs may be readily deflected laterally to fit in any misaligned holes in the tag.

The latch 35 is pivotally mounted on the stud 28 and is normally held in latching position by compression spring 29. A solenoid 37 is mounted on a bracket 38 integral with the hand grip 12 and has its armature pivotally connected to a tail piece of the pawl 35 whereby energization of the solenoid will effect release of the pawl 35 to permit the jaws to open.

A normally open read-out machine initiating switch 40 is mounted in the hand grip 12 and has an operating plunger 41 located in the path of a bell crank 42 pivoted at 43 in the hand grip 32. A torsion spring 44 normally maintains the bellcrank 42 in its position shown relative to the hand grip. When the hand grips are squeezed together and just as the latch 35 becomes effective to lock the jaws in closed condition, an ear 45 on the bellcrank 42 will depress the switch plunger 41 sufficiently to complete a machine initiating circuit, to be described later. A further slight over-travel of the hand grip 32 will engage an ear *45a* against the grip 12 thereby rocking the bellcrank counterclockwise enabling the ear 45 of the bellcrank to slip off the plunger 41 and thereby assume the dot and dash line position *42a*. The latter movement will permit the switch 40 to open, thereby releasing the hereinafter described solenoid 72 to permit the restoration of the latch 70.

The various contacts 25 carried by the upper jaw member 23 are connected to a data recording apparatus, to be described presently, through individual lines forming a flexible cable 46 extending into the hand grip 12.

Although various types of data recording apparatus may be connected to and controlled by the tag sensing device, the apparatus disclosed herein is disclosed and claimed in the co-pending applications of Robert E. Loudon, Serial No. 692,881, filed October 28, 1957, and Kenneth F. Oldenburg et al., Serial No. 698,510, filed November 25, 1957.

The apparatus comprises a recording and registering machine basically similar to the commercially available Clary adding machine which is disclosed in the R. E. Boyden patent, No. 2,583,810, issued on January 29, 1952.

The machine includes a plurality of denominationally arranged racks 50 guided for fore and aft movement by shafts 51 and 52 which are embraced by guide slots 53 and 54, respectively, in each rack. The shaft 52 is moved fore and aft of the machine, once during each cycle, and for this purpose is suitably guided in slots (not shown) in the machine side frames.

The shaft 52 is yieldably connected to each rack by a pair of drive pawls 55. The latter carry rollers 56 normally held in depressions 57 formed on opposite edges of the associated slot 54 by a tension spring 58. Thus, whenever a rack is arrested, the rollers 56 ride out of their associated depressions.

Figure 10:
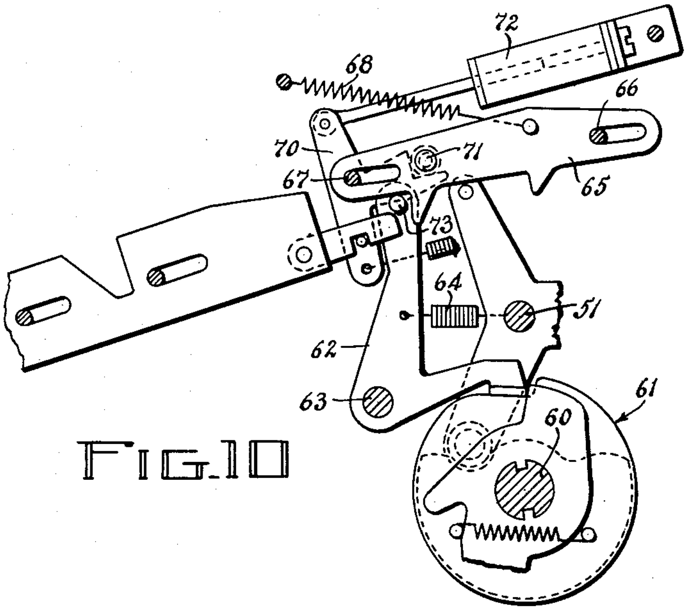
FIG. 10 is a sectional view illustrating the main clutch of the data recording apparatus.

The machine is driven by a rotatable drive shaft 60 which is rotated one revolution during each machine cycle by a motor driven cyclically operable clutch 61 (FIG. 10). The latter is controlled by a clutch dog 62 pivoted at 63 normally held in a clutch disengaging position by a relatively light spring 64.

The clutch dog is actuated to effect engagement of the clutch by a slide 65 guided for endwise movement on frame pins 66 and 67 and urged to the left in FIG. 10 by a relatively heavy tension spring 68. The slide is normally maintained in its position shown by a latch 70 fulcrumed on the frame pin 67 and provided with a latching shoulder normally engaging a stud 71 on the slide. The latch 70 is pivotally connected to the armature of a solenoid 72 suitably attached to the machine side frame (not shown) and connected in circuit with the power supply line 73 (FIG. 12) and the switch 40. Accordingly, when the switch 40 is closed by squeezing the hand grips together, the solenoid 72 will be energized, causing the latch 70 to release the slide 65 which is effective to engage a stud 73 on the clutch dog whereby to rock it against the action of its spring 64 to cause engagement of the clutch 61.

Figures 5, 6:
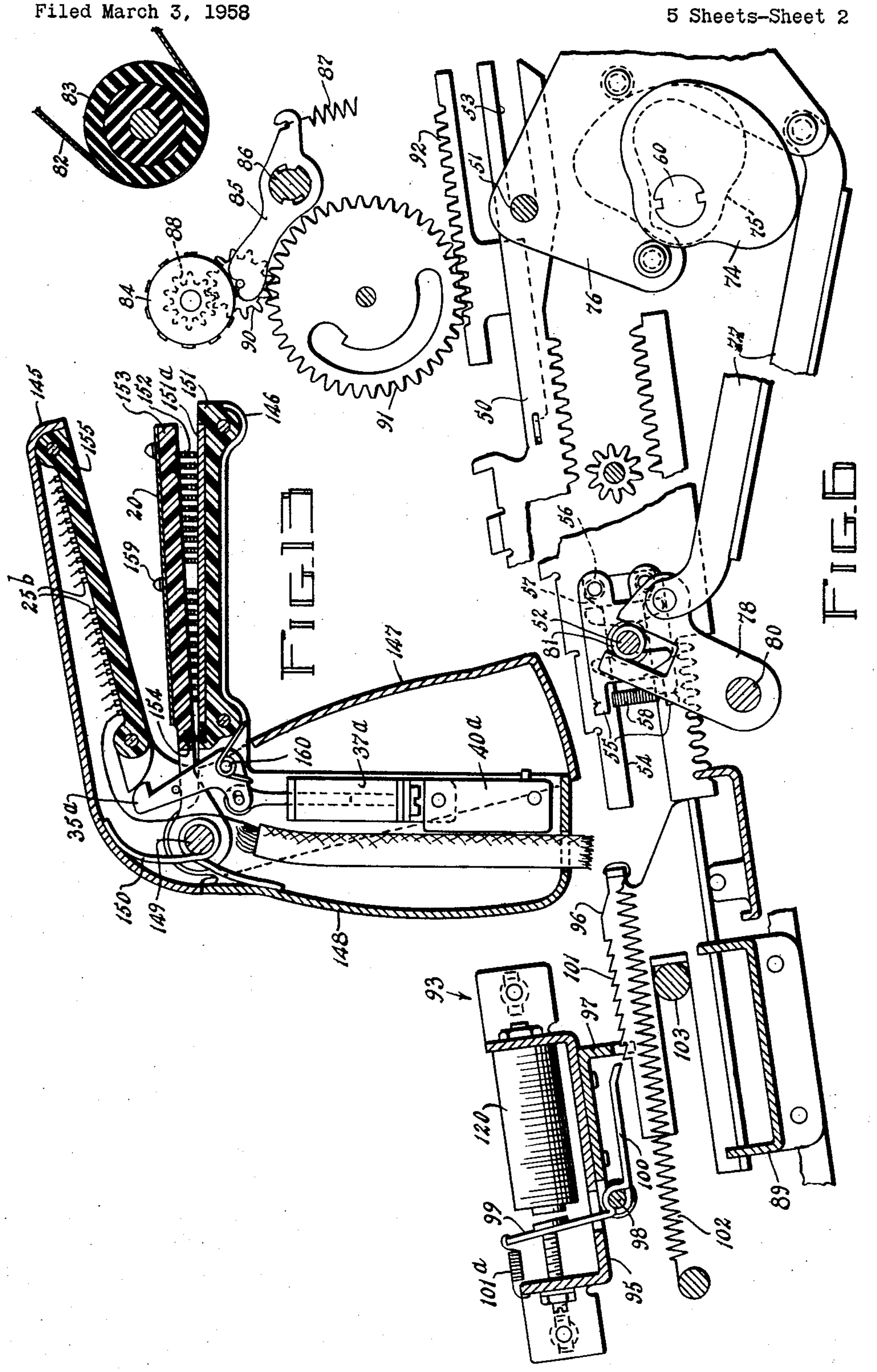
FIG. 6 is a sectional view, with parts broken away, of a data recording apparatus associated with a tag sensing device.

A pair of complementary cams 74 and 75 (FIG. 6) are keyed on the shaft 60 and are engaged by rollers carried on a cam follower 76 which is fulcrumed on the shaft 51 and is connected by a link 77 to a bifurcated arm 78. The latter is fixed on a rock shaft 80 extending across the machine and secured to a similar bifurcated arm on the opposite end. These arms, i.e. 78, embrace rollers, i.e. 81, on the shaft 52 so as to cause parallel fore and aft movement of the shaft during the machine cycle.

The various values represented by the numerical positions to which the racks 50 are advanced by the shaft 52 are printed on a paper tape 82 which is fed around a platen 83 to a printing station where the values represented by the positioning of the racks are printed.

The printer comprises a series of numeral printing wheels 84, each operatively entrained with an associated one of the cracks 50. Each printer wheel has spaced around its periphery a series of type characters. Each printer wheel is rotatably mounted on an individual type arm 85 which is loosely keyed on a printer control shaft 86 and urged clockwise by a tension spring 87. A gear 88 integral with each type wheel meshes with a gear 90 also rotatably mounted on the respective type arm. Except during a printing operation, the gears 90 mesh with idler gears 91 which continually mesh with rack sections 92 carried by the racks 50.

Figure 7:
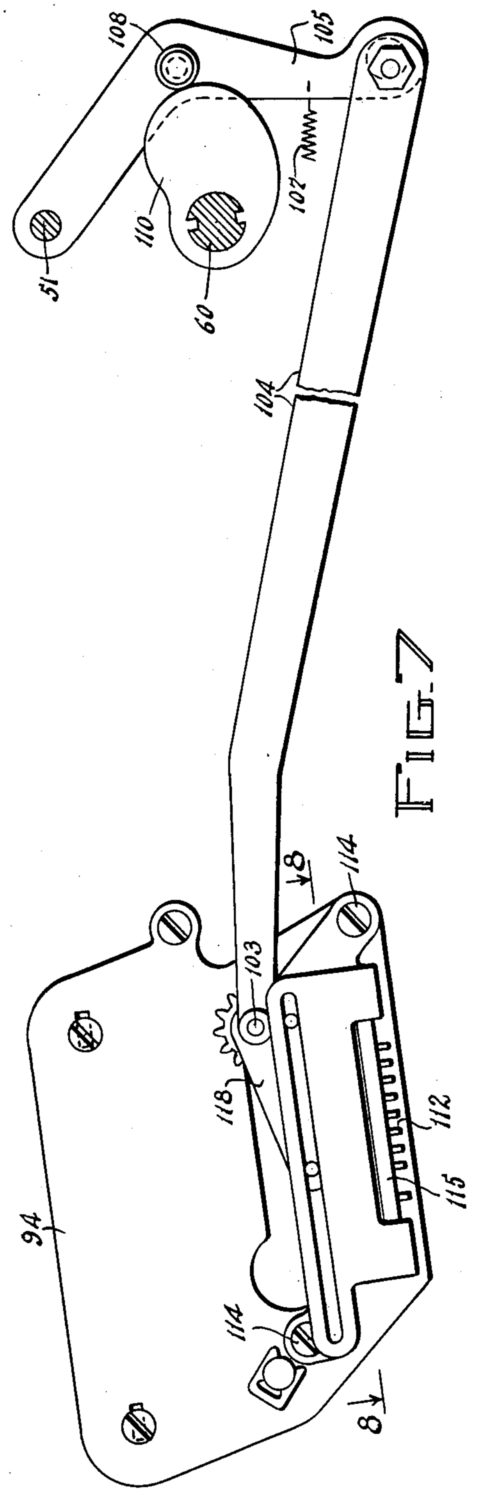
FIG. 7 is a side view of the rack stop control mechanism incorporated in the data recording apparatus.

Means are provided for arresting the various racks 50 in different numerical positions corresponding to the numerical data represented by the positioning of perforations in a tag being sensed or read. For this purpose, a rack arresting unit, generally indicated at 93, is provided. The latter comprises side frame plates, one of which is shown at 94 (FIG. 7), suitably secured to the machine side plates (not shown). A U-shaped cross brace 95 extends between the side plates 94 and is suitably attached thereto. A second U-shaped cross brace 89 is also extended between the plates 94 and is suitably attached thereto.

Denominationally arranged rack stop slides 96 are slideably mounted for endwise movement in slots formed in the cross brace 89 and in a brace 97 suitably attached to the cross brace 95.

The brace 97 supports a pivot rod 98 on which are pivoted stop pawls 100 each effective to engage any of a series of teeth 101 formed in an aligned stop slide 96. An upwardly extending portion of each stop pawl 100 forms an armature 99 which cooperates with an electromagnet 120 effective when energized to engage the stop pawl with one of the teeth 101. A spring *100a* normally maintains each stop pawl in an ineffective condition.

The various stop slides 96 are urged forwardly by tension springs 102 but are normally held in their rearward illustrated positions, wherein they abut the forward ends of respective ones of the racks 50 by a control shaft 103.

The shaft 103 is advanced substantially in time with the rack drive shaft 52 whereby to permit the stop slides 96 to follow until arrested by respective pawls 100. For this purpose, the shaft 103 is connected by a link 104 (FIG. 7) to a cam follower 105 which is fulcrumed on shaft 51 and urged clockwise by a spring 107 to maintain a roller 108 thereon in engagement with a cam 110 keyed on the shaft 60.

Figure 9:
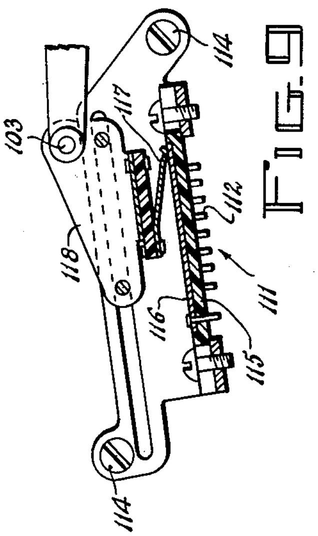
FIG. 9 is a sectional view taken along the line 9—9 of FIG. 8 illustrating the scanning switch.
Figure 8:
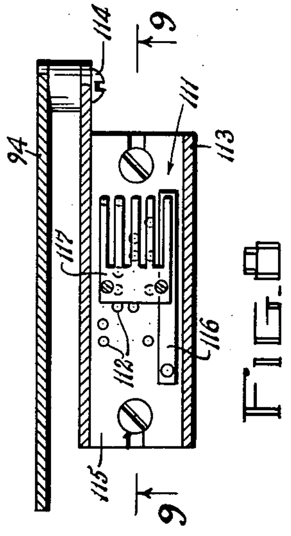
FIG. 8 is a sectional plan view taken along the line 8—8 of FIG. 7 illustrating the scanning switch incorporated in the data recording apparatus.

A scan switch, generally indicated at 111 (FIGS. 8, 9 and 12) is provided to successively scan a matrix of various contacts 112 which are arranged in a pattern in accordance with the particular code punched in the tag.

The scan switch comprises a frame 113 attached by screws 114 to one of the side plates 94. The bottom of the frame 113 has an opening therein which is bridged by a plate 115 of insulating material in which the various contacts 112 are embedded. A conductor strip 116 is also embedded in the plate 115 and the contacts and strip are arranged to be bridged by a scanning brush 117 attached through an insulated mounting to a brush carrier 118. The latter is connected to the shaft 103 and therefore moves with the shaft to successively scan different sets of laterally aligned contacts 112 during advancement of the various stop slides forwardly of the machine.

Figure 12:
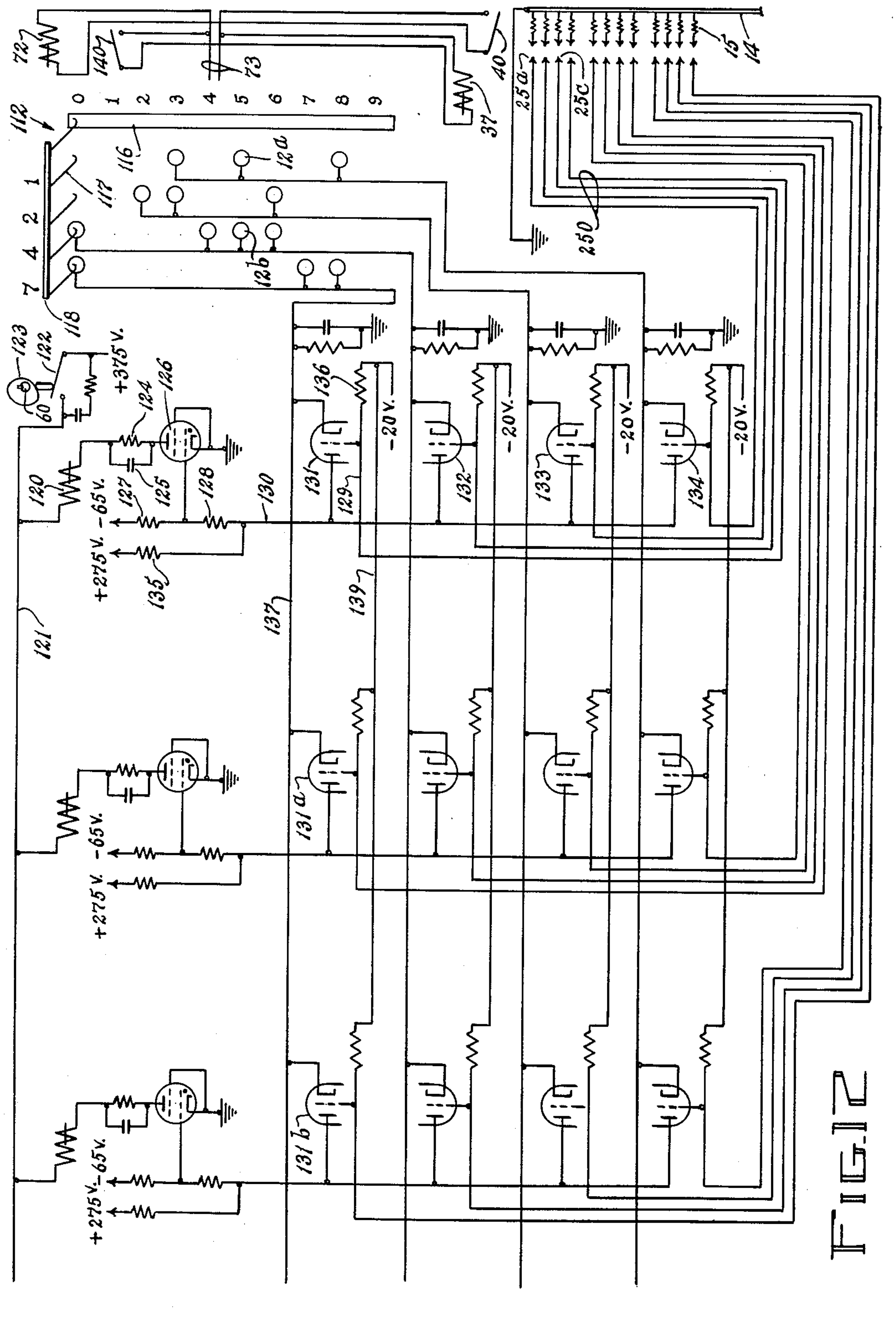
FIG. 12 is a circuit diagram illustrating the electrical controls for the data recording apparatus.

Describing now the manner in which the various racks 50 are differentially arrested under control of the tag sensing device, reference is hereby made to the circuit diagram of FIG. 12. Although only three denominational orders of the machine control circuitry are shown, the remaining orders will be understood to be similar.

As shown, the left hand ends of the various electromagnets 120 are connected through a common line 121 and a normally open switch 122 to a source of +375 volt supply. The switch 122 is controlled by a cam 123 keyed on the shaft 60, the cam 123 being effective to close the switch 122 at the commencement of a cycle and to reopen the switch after the shafts 52 and 103 have advanced leftwardly in FIG. 6 to their fullest extents, and before their return.

The right hand end of each electromagent 120 is connected through parallel connected resistor 124 and capacitor 125 to the anode of a thyratron tube 126 which may be of the type commercially known as type 2D21. The cathode of the tube is grounded and the ignitor is normally held below its critical firing point by connection to a −65 volt supply through a one megohm resistor 127. The ignitor is also connected through a 2.4 megohm resistor 128 and line 130 to the anodes of opposite triodes 131, 132, 133 and 134 of two vacuum tubes of the type commercially available as type 5963.

A source of +275 volts is connected through a one megohm resistor 135 to the anode line 130 and is effective, when none of the triodes 131 to 134 are conducting, to raise the potential of the ignitor of tube 126 above its firing point.

The grids of the various triodes 131 to 134 are connected to respective ones of the contacts 25 located in an associated denominational group of contacts in the tag sensing device by lines, like line 129. Each grid is also connected to a −20 volt supply line, i.e. 139, through a one megohm resistor 136.

The cathodes of all upper triodes, i.e. 131, **131*a* and 131*b*, associated with all denominational order circuits of the machine are connected through a common line 137 to the higher order row of scan switch contacts 112. Likewise, the cathodes of all similar remaining triodes are connected through common lines to corresponding lower order rows of the contacts 112**.

From the above, it will be seen that if all triodes for any one denominational order of the machine are held non-conducting, the voltage will rise sufficiently to ignite the corresponding thyratron 126 to arrest the associated rack.

The sensing spring plate 14 (FIGS. 1 and 12) is grounded. Thus, when a digit circuit is completed through a perforation in the tag, ground will be applied through a respective line, like line 129, to the grid of the associated tube to thereby cause (in the absence of a high voltage supplied to its cathode) such tube to conduct to lower the voltage potential in the anode line below that required to fire the thyratron tube.

The particular code chosen for illustration is the 1–2–4–7 type in which the decimal 0 is represented by perforations in the "4" and "7" denominational orders.

Considering, for example, the units denominational order of the machine and the corresponding group of four contacts 25 in the units denominational order of the tag sensing device, such contacts are connected through four lines 250 to the grids of the corresponding triodes 131 to 134. Consider, further, an example in which contacts **25*a* and 25*c* complete circuits through aligned perforations in the tag, representing the decimal value 5. In such case, the tubes 134 and 132 become condutive thereby to lower the potential in the anode line 130 even though the tubes 131 and 133** may be conducting.

As the rack drive mechanism advances the associated rack in the units denominational order (moving with it the brush 117) and as the rack and brush 117 reach their No. 5 numerical positions, the brush applies +50 volts through the contact strip 116 and through contacts **12*a* and 12*b* to the cathodes of now conducting tubes 134 and 132, respectively, causing them to become non-conductive. Since the remaining tubes are also non-conducting at the present time, the potential in line 130 will rise sufficiently to fire the tube 126** and thus arrest the rack in its No. 5 position.

Figure 11:
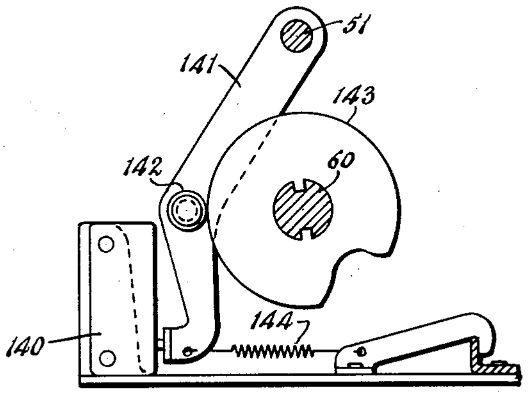
FIG. 11 is a sectional view illustrating the machine controlled switch for releasing the tag sensing device from closed condition.

As mentioned heretofore, means are provided for releasing the tag sensing device from its closed condition after the racks have been arrested in their forwardly advanced positions. For this purpose, a switch 140 (FIGS. 11 and 12) is located in the machine and is controlled by a cam follower 141 fulcrumed on the shaft 51 and provided with a roller 142 engaging a cam 143 keyed on the main drive shaft 60. The cam follower normally holds the switch 140 in open condition until after the rack drive mechanism has advanced to its forward extremity of travel whereupon a tension spring 144 becomes effective to force the cam follower to follow into a depression in the cam, permitting the switch 140 to momentarily close. The latter is connected in circuit with the power supply line 73 and with the solenoid 37 in the hand grip 12. Accordingly, the solenoid is energized to release the latch 35, permitting the jaws of the tag sensing device to be urged open by the spring 31.

FIG. 13 illustrates a modified form of tag sensing device in which jaws 145 and 146 are pivoted together on a pivot stud 149 and extend integral with overlapping hand grips 147 and 148, respectively.

A torsion spring 150 normally holds the jaws in illustrated position.

The lower jaw 146 supports a plate 151 of insulating material in which is embedded a sensing spring supporting plate **151*a* which supports a plurality of sensing springs 152 similar to the springs 15 of FIG. 4. The upper ends of the springs 152 extend through aligned openings in a tag locating plate 153 which is also pivoted on the stud 149. The plate 153 is urged upwardly a slight amount above the plate 151 by a compression spring 154 so as to locate a perforated tag 20 slightly above the upper sensing tips of the springs 152. For this purpose, tag locating pins 159 are attached to the plate 153** and project upwardly therefrom.

A contact plate 155 of insulating material is supported by the upper jaw 145 and has a plurality of contacts **25*b* connected in a manner similar to the contacts 25** of FIG. 12.

When the hand grips are squeezed together, the contact plate 155 is forced downwardly against the inserted tag 20, thus forcing the plate 153 downward against plate **151*a* to establish electrical contact through any perforations in the tag. As the jaws 145 and 146 are closed, a latch 35*a* pivotally supported at 160 on the hand grip 148 latches over a shoulder 34*a* on the plate 155 to lock the jaws in closed condition until released by a solenoid 37*a***.

A switch **40*a* mounted in the hand grip 148 is located in a machine initiating circuit in a manner similar to the switch 40 of FIG. 1 and is closed by the hand grip 147 just as the latch 35*a*** becomes effective to lock the jaws closed.

Although I have described my invention in detail in its preferred and modified forms and have therefore used certain specific terms and language herein, it is to be understood that the present disclosure is illustrative rather than restrictive and that certain changes and modifications may be made without departing from the spirit or scope of the claims appended hereto.

Having thus described the invention, what I desire to secure by United States Letters Patent is:

1. A portable perforated record sensing device comprising a contact plate member of electrically insulating material having a plurality of electrical contacts thereon, a plurality of endwise yieldable electrically conductive sensing pins, an electrically conductive member supporting said sensing pins for endwise movement toward and away from said plate member, means operatively connecting said members whereby to move said sensing pins toward and away from said contact plate member, means for locating a perforated record to be sensed intermediate said members, a first hand grip integral with one of said members, a second hand grip operatively connected to the other of said members, said second hand grip extending in juxtaposition with said first hand grip and cooperating with said first hand grip, and means whereby when said grips are squeezed together by an operator's hand said sensing pin supporting member will move said sensing pins through any aligned openings in said record and into engagement with said contact plate member.

2. A portable perforated record sensing device comprising a contact plate member, a plurality of sensing pins, a member supporting said pins, means operatively connecting said members whereby to move said sensing pins toward and away from said contact plate member, a perforated record locating element intermediate said members, spring means normally supporting said locating element with a record locating surface thereof above the tips of said sensing pins whereby to normally locate a perforated record above said pins, a first hand grip integral with one of said members, and a second hand grip operatively connected to the other of said members and cooperating with said first hand grip whereby when said hand grips are squeezed together by an operator's hand said sensing pin supporting member will move said sensing pins toward said contact plate member, said spring means being yieldable upon movement of said members toward each other to permit entry of said pins in aligned perforations in said record.

3. A portable perforated record sensing device comprising a member having a plurality of electrical contacts thereon, a support member, a plurality of helically coiled springs attached at one end of each thereof to said support member, said springs being self-supporting on said support member, the other end of each of said springs forming a perforation sensing tip, said springs yieldably supporting said tips thereof for both axial and lateral movement, means for locating a perforated record intermediate said members, and means for moving said members toward and away from each other whereby to move said sensing tips toward and away from said contacts, said tips and respective ones of said contacts being effective to establish respective circuits upon engagement with each other.

4. A portable perforated record sensing device comprising a contact plate member, a support member, a plurality of helically coiled compression springs attached at one end of each thereof to said support member, said springs being self-supporting on said support member, the other end of each of said springs extending axially of the length thereof to form a perforation sensing tip, means operatively connecting said members whereby to move said sensing pins toward and away from said contact plate member, a record locating element extending between said members, said locating element having perforations therein aligned with said springs but out of contact therewith, and means normally maintaining said locating element with a record locating surface thereof above the tips of said springs, said last mentioned means being yieldable upon movement of said members toward each other whereby to permit said pins to project through said perforations in said locating element and through any aligned perforations in said record.

5. A portable sensing device for perforated records comprising a contact plate member, a supporting member, a plurality of helically coiled compression springs attached at one end of each thereof to said supporting member, the opposite end of each of said springs forming a sensing tip, a locating element for a perforated record extending between said members, said locating member having perforations therein aligned with said springs, means pivotally connecting said members and said locating element for movement about a common pivot axis, and spring means for normally maintaining said locating element with a record locating surface thereof above said tips of said springs, said spring means being yieldable upon movement of said members toward each other whereby to permit said pins to project through said perforations.

6. A portable punched record sensing device comprising a contact plate member having a plurality of contacts thereon, a second member, a plurality of helically coiled compression springs attached at one end of each thereof to said second member, said springs being self-supporting on said second member, the opposite end of each of said springs extending axially of the length of said spring and toward a respective one of said contacts to form a sensing tip, a record locating element extending between said members and having perforations thereon aligned with said sensing tips, and means for moving said members toward each other whereby to move said sensing tips toward respective ones of said contacts, said perforations being larger than said tips and larger than the perforations in said record medium whereby to permit said springs to deflect laterally upon entering misaligned openings in said record perforations.

References Cited in the file of this patent

UNITED STATES PATENTS

| | | |
|---|---|---|
| 677,214 | Hollerith | June 25, 1901 |
| 1,791,952 | Bryce | Feb. 10, 1931 |
| 2,122,206 | Keefe | June 28, 1938 |
| 2,258,290 | Johnstone et al. | Oct. 7, 1941 |
| 2,307,635 | Mueller | Jan. 5, 1943 |
| 2,484,114 | Page et al. | Oct. 11, 1949 |
| 2,798,668 | Watkin | July 9, 1957 |
| 2,842,312 | Weeks | July 8, 1958 |
| 2,890,828 | Stark et al. | June 16, 1959 |
| 2,980,319 | Clemens et al. | Apr. 18, 1961 |